(12) United States Patent
Bormann et al.

(10) Patent No.: US 8,839,655 B2
(45) Date of Patent: Sep. 23, 2014

(54) TEST STAND WITH AN APPARATUS FOR CALIBRATING A FORCE-MEASURING DEVICE

(75) Inventors: Jens Bormann, Weiterstadt (DE); Klaus Pätschke, Bürstadt (DE); Kai Künne, Viernheim (DE)

(73) Assignee: Horiba Europe GmbH (DE)

( * ) Notice: Subject to any disclaimer, the term of this patent is extended or adjusted under 35 U.S.C. 154(b) by 390 days.

(21) Appl. No.: 13/360,321

(22) Filed: Jan. 27, 2012

(65) Prior Publication Data

US 2012/0167657 A1 Jul. 5, 2012

Related U.S. Application Data

(63) Continuation of application No. PCT/EP2010/002953, filed on May 12, 2010.

(30) Foreign Application Priority Data

Jul. 31, 2009 (DE) .......................... 10 2009 035 410

(51) Int. Cl.
*G01L 25/00* (2006.01)
(52) U.S. Cl.
CPC ..................................... *G01L 25/00* (2013.01)
USPC ....................................................... 73/1.15
(58) Field of Classification Search
CPC ...... G01L 25/00; G01L 25/003; G01L 25/006
USPC .......................................................... 73/1.08
See application file for complete search history.

(56) References Cited

FOREIGN PATENT DOCUMENTS

| CN | 101140182 | | 3/2008 | |
|---|---|---|---|---|
| DE | 33 31 708 | | 3/1985 | |
| DE | 3331708 | A1 * | 3/1985 | .............. G01L 25/00 |
| DE | 10145867 | A1 * | 4/2003 | |
| DE | 10 2006 055 614 | | 11/2006 | |
| EP | 1 293 765 | | 3/2003 | |
| EP | 1293765 | A2 * | 3/2003 | .............. G01L 25/00 |
| JP | 01264640 | | 10/1989 | |
| JP | 01320444 | A * | 12/1989 | .............. G01L 25/00 |
| JP | 07108359 | | 5/1995 | |
| JP | 09118013 | | 5/1997 | |
| JP | 2000042420 | | 2/2000 | |

OTHER PUBLICATIONS

International Preliminary Report of PCT/EP2010/002953.
International Search Report of PCT/EP2010/002953.
Office action of Chinese Patent Application No. 201080033097.6 dated Dec. 4, 2013.
Office Action of the European Patent Office dated Jan. 2, 2013.

* cited by examiner

*Primary Examiner* — Hezron E Williams
*Assistant Examiner* — Nathaniel Kolb
(74) *Attorney, Agent, or Firm* — Mayback & Hoffman, P.A.; Gregory L. Mayback; Rebecca A. Tie (57) ABSTRACT

A test stand encompasses a dynamometer, which is supported to oscillate about a main axis, from which a lever arm extends perpendicularly. For calibrating a force-measuring device, which is coupled to the lever arm, provision is made for a pneumatic cylinder as reference force-generating device. The reference force can be measured by a load cell and can be applied to the lever arm via a yoke. The force-measuring device, which is to be calibrated, the pneumatic cylinder, the load cell, and the yoke are disposed on the same side of the dynamometer and act on the same lever arm.

16 Claims, 6 Drawing Sheets

TEST STAND WITH AN APPARATUS FOR CALIBRATING A FORCE-MEASURING DEVICE

CROSS-REFERENCE TO RELATED APPLICATIONS

This is a continuing application, under 35 U.S.C. §120, of copending International Application No. PCT/EP2010/002953, filed May 12, 2010, which designated the United States and was not published in English; this application also claims the priority, under 35 U.S.C. §119, of German Patent Application No. 10 2009 035 410.7, filed Jul. 31, 2009; the prior applications are herewith incorporated by reference in their entirety.

STATEMENT REGARDING FEDERALLY SPONSORED RESEARCH OR DEVELOPMENT

Not Applicable

FIELD OF THE INVENTION

The invention relates to a calibrating method for a test stand as well as to a test stand comprising an apparatus for calibrating a force-measuring device.

BACKGROUND OF THE INVENTION

Such test stands, e.g., vehicle, engine or transmission test stands, are used by the automobile industry, among others, and support research and development with the help of functional tests, endurance trials for the mechanical load test as well as consumption, exhaust gas, and noise or climate analyses, for example. These test stands simulate the operation of a vehicle or of vehicle components under different environmental or application conditions. The vehicle or the vehicle components, which are to be tested, can be coupled on the test stand to a load device, e.g., an asynchronous machine, a hydraulic dynamometer, or an eddy current brake. The load device simulates the load, against which the engine must operate in actual real operation.

In addition to numerous measured variables, the torque acting between the vehicle and the load device is of particular importance. For this purpose, the load device is supported to oscillate, so that the torque, which the vehicle applies to the load device, must be supported on the housing of the load device, which is supported to oscillate. A lever arm, on the outer end of which provision is made for a force-measuring device (to measure the force that is transmitted via the lever arm), is attached to the housing of the load device. The torque, which acts on the load device and which is thus output by the vehicle, can be determined in this manner by the measured force and the length of the lever arm, which is effective here.

Due to the fact that high demands are made on the accuracy of the torque measurement, the force-measuring device must be calibrated from time to time.

In the case of a roller-type test stand, the rollers must be freely rotatable for calibrating. A certain reference torque, the value of which is compared to the torque measured by the test specimen torque transducer (lever arm and force-measuring device), is then applied to the load device or to the housing of the load device, respectively, to carry out an adjustment, in particular, of the force-measuring device, if necessary.

The reference torque must be predetermined or preselected, respectively, with the highest possible accuracy. A calibrating method, which is based on the double lever principle, e.g., and which is described in European Patent Application 1,293,765, proved to be effective for this purpose. In this reference, provision is made on the housing of the load device (a dynamometer) for a lever arm, at the end of which the force-measuring device (which is to be calibrated) is disposed. Opposite the lever arm, a second lever arm must be attached to the housing of the load device on the other side of the housing for carrying out the calibration, provision being made on the housing for a load device in the form of a hydraulic or a pneumatic cylinder. The cylinder applies a force to the additional lever arm. The force is determined by a reference load cell. In the event that the load device is otherwise not loaded by any further external load, the actual force-measuring device must, accordingly, measure a corresponding value, which is a function of the lever ratios. If this is not the case, the force-measuring device must be adjusted.

In the case of the calibrating apparatuses known from the state of the art, a considerable additional technical effort, e.g., in the form of additional lever arms, is required in each case. In addition, it is possible for the load device to be lifted out of its supports due to unsuitable force introduction, whereby the calibrating result can be impacted or distorted, respectively.

SUMMARY OF THE INVENTION

The invention provides a test stand comprising an apparatus for calibrating a force-measuring device that overcomes the hereinafore-mentioned disadvantages of the heretofore-known devices and methods of this general type and that provide such features with minimized technical effort and, nonetheless, improved calibrating results.

A test stand comprising an apparatus for calibrating a force-measuring device encompasses a load device, which is supported to oscillate about a main axis, comprising a housing, from which a lever arm extends perpendicular to the main axis. A force-transmission device is coupled to the lever arm for transmitting a force, which is oriented perpendicular to the main axis and perpendicular to the lever arm to one side. A force-measuring device is coupled to the lever arm by the force-transmission device. The test stand is characterized by a reference force-generating device for generating a reference force, by a reference force-measuring device, which is coupled to the reference force-generating device for measuring the respective generated reference force, and by a reference force-transmission device, which is coupled to the lever arm, for transmitting the reference force to the lever arm.

The lever arm, thus, extends perpendicularly away from the housing in a known manner. This does not necessarily imply that the lever arm may only extend away from the housing in perpendicular direction. Instead, this also implies that the lever arm extends away from the housing diagonally, for example. What matters is only that the orientation of the lever arm comprises an extension component, which extends perpendicularly away from the housing and the axis, to thus obtain a lever arm, which is effective about the main axis.

The main axis of the load device corresponds to the main axis of the test stand.

The lever arm is supported on the force-measuring device in the known manner via the force-transmission device, so that the force-measuring device can measure a force, which is exerted by the lever arm. In the event that the location, at which the force-transmission device conveys the force to the force-transmission device is known and thus also the distance of this location from the main axis, the effective length of the lever arm is thus also known. The torque acting on the load device can be determined accurately from the effective length and the measured force.

Contrary to the state of the art, provision is additionally made on the lever arm, which is oriented only to one side, for the reference force-transmission device, which introduces the reference force, which is generated by the reference-force generating device, on the lever arm.

The reference force-generating device thus generates the reference force, which is measured additionally by the reference force-measuring device, which is disposed in the flux of force. The reference force is introduced on the lever arm so that the force is guided to the force-measuring device at a different location via the force-transmission device. The force-measuring device, e.g., a tensile force-measuring device, can be calibrated in this manner such that it—in consideration of the respective lever ratios—displays a force measurement value, e.g., a tensile force measurement value, which is proportional to the reference force value measured by the reference force-measuring device.

The force-measuring device comprising the force-transmission device and the reference force-generating device comprising the reference force-transmission device can be disposed on the same side of the housing relative to the main axis. Through this, an additional lever arm is not required for the calibrating process. Instead, the calibrating device (reference force-generating device, reference force-measuring device and reference force-transmission device) can be disposed in a vicinity of the force-measuring device. In addition, a lifting of the load device out of its center of rotation or its supports, respectively, can be avoided.

The reference force-generating device can encompass a pneumatic or hydraulic cylinder unit. The reference force-generating device can, thereby, optionally generate forces in both directions. In this manner, the calibrating process can be simplified, accelerated, and automated. Different load cycles and steps can be realized simply, e.g., by non-periodically controlling the reference force-generating device. A remanence (zero point hysteresis) in the force-measuring chain, for example, can thus also be detected and can be considered in response to the adjustment. The measuring chain can be optimized in this manner.

The load device can be a dynamometer, wherein the lever arm is fastened to a stator housing of the dynamometer and extends perpendicular to the main axis. In practice, a dynamometer has proved to be highly effective as load device. The lever arm can also extend diagonally to the stator housing. What matters is only that it encompasses an extension component, which runs perpendicular to the main axis and thus to the stator housing.

The reference force-transmission device can be disposed at the outer end of the lever arm. In this manner, the length of the lever arm is utilized fully and the accuracy of the calibration is improved. The force-transmission device, which is necessary for the normal measuring operation, e.g., a tensile force-transmission device, and the force-measuring device can then be disposed between the outer end of the lever arm and the stator housing of the load device.

In one exemplary embodiment, the reference force-transmission device encompasses a yoke, which encloses the outer end of the lever arm. A reliable transmission of the reference force is possible with the help of the yoke. In addition, the provision of the yoke allows for a highly accurate determination of the effective length of the lever arm and thus of the measuring accuracy.

For transmitting the reference force, a pairing of a knife edge and a knife edge support can be disposed above and below the lever arm respectively between the yoke and the lever arm. Either the knife edge can thereby respectively be provided on the lever arm and the opposite knife edge support can be provided on the yoke or the knife edge can respectively be provided on the yoke and the opposite knife edge support can be provided on the lever arm. It can be ensured, with the help of the knife edge and the assigned knife edge support between yoke and lever arm, that the reference force is transmitted onto the lever arm only via the knife edge, thus with a line contact. The knife edge thereby extends parallel to the main axis. The effective length of the lever arm can be determined in a correspondingly accurate manner.

The yoke can encompass a substantially square frame, which encloses the outer end of the lever arm. The designation of a "square" frame does not require that the frame must actually encompass exactly four corners. Instead, a square frame is to be understood as a frame, which encompasses an upper side and a lower side, which are connected to one another by two lateral connecting elements. On principle, this results in a type of square (or rectangle), which can, of course, also encompass more corners or rounded corners.

In an alternative exemplary embodiment, a flange of a piece of foil can be fastened respectively to the frame on the upper side and/or on the lower side of the frame, wherein an area of the piece of foil, which is located between the upper side and the lower side of the frame, is fastened to the end of the lever arm. In this alternative, it is not necessary to provide the above-described pairings of knife edge and knife edge support. Instead, the reference force is transmitted via the piece of foil. The piece of foil can be plastic or metal. It encompasses a high tensile strength, but a minimal stiffness. Accordingly, the piece of foil is suitable for transmitting the reference force as tensile force from the yoke to the lever arm. However, in the event that the force acts in the opposite direction, a compressive force, which cannot be transmitted due to the low stiffness or compressive strength, respectively, will now be applied to the part of the piece of foil, which was previously tensioned. The stiffness should thereby be as low as possible, so as not to impact the reference force. Vice versa, the reference force is then transmitted by the other, opposite part of the piece of foil, which is then able to convey a tensile force.

In response to the installation of the piece of foil, the foil can be installed loosely, e.g., with a slight bulge or corrugation, thus in any event without initial tension, to ensure a mechanically unloaded state in or around the zero point.

The piece of foil should be as thin as possible, so as to be able to accurately determine the effective length of the lever arm.

The piece of foil can be embodied as a one-piece piece of foil. In this case, the piece of foil can be clamped with its upper flange to the upper side of the frame of the yoke and with its lower flange on the lower side of the yoke frame. A middle area of the piece of foil can then be clamped to a frontal end of the lever arm.

In another exemplary embodiment, the piece of foil can be formed by two separate pieces of foil, wherein the one of the pieces of foil is an upper piece of foil, which is clamped between the upper flange of the frame and the frontal end of the lever arm, and the other one of the pieces of foil is a lower piece of foil, which is clamped between the lower flange of the frame and the frontal end of the lever arm.

The decision whether the piece of foil is realized as one part or in the form of two separate pieces of foil will substantially have to be made based upon assembly considerations.

The reference force-generating device can be supported on a support, which is coupled to a base of the test stand, via a compensating device, wherein the compensating device is embodied for compensating alignment and/or angle errors. With the help of the compensating device, the position and orientation of the reference force-generating device can be adjusted with high accuracy, to generate a reference force, which acts exactly perpendicular on the lever arm.

In one exemplary embodiment, provision can be made for a control device for controlling the reference force-generating device, wherein a higher force than the nominal reference force can be effected temporarily by the control device in response to the adjustment of a desired nominal reference force when the reference force is increased or a lower force than the nominal reference force can be effected temporarily when the reference force is reduced.

An overshooting when generating the reference force can be effected with this measure, e.g., to overcome the static friction in the supports of the load device. The control device effects a temporary overshooting beyond the actually desired nominal reference force value and only adjusts the desired reference force after the overshooting.

In a method for calibrating a force-measuring device in a test stand of the invention, provision is initially made for a test stand comprising the above-specified features. This is followed by the steps of:
  generating a reference force by the reference force-generating device;
  measuring the reference force by the reference force-measuring device;
  measuring the force acting on the force-measuring device in the form of an actual force value;
  determining a nominal force value, which would have to apply to the force-measuring device due to the measured reference force and the effective lever ratios; and
  calibrating the force-measuring device such that the actual force value measured by the force-measuring device, is compared to the nominal force value.

After the calibration, an adjustment of the force-measuring device and/or of the electronic circuits, which are connected thereto, can be carried out, if necessary.

The method is suitable, in particular, for calibrating a tensile force-measuring device and can be embodied such that an overshooting of the reference force beyond the desired (target) reference force value is initially effected when generating the reference force.

The reference force-generating device can be controlled such that the lever arm is not loaded with a force from the reference force-generating device. A mechanically unloaded state of the lever arm can be obtained through this, to calibrate the zero point.

Although the invention is illustrated and described herein as embodied in a test stand comprising an apparatus for calibrating a force-measuring device, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which.

DETAILED DESCRIPTION OF THE INVENTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments of the present invention. Referring now to the figures of the drawings in detail and first, particularly to FIGS. 1 and 2, there is shown a first exemplary embodiment of a section of a test stand according to the invention. The test stand encompasses a base frame 1, which is configured in a very massive and stable manner, comprising a plurality of steel beams or pipes, respectively. The base frame 1 encompasses a support frame 1a, on which a dynamometer 2 as a load device is supported to oscillate about its main axis X. The oscillating support cannot be seen in FIG. 1, but is well known from the state of the art. For instance, it is common to support a dynamometer so that it can oscillate and thus determine torque acting on the dynamometer by the reaction force on a lever arm, which is attached to the dynamometer.

Figure 1:
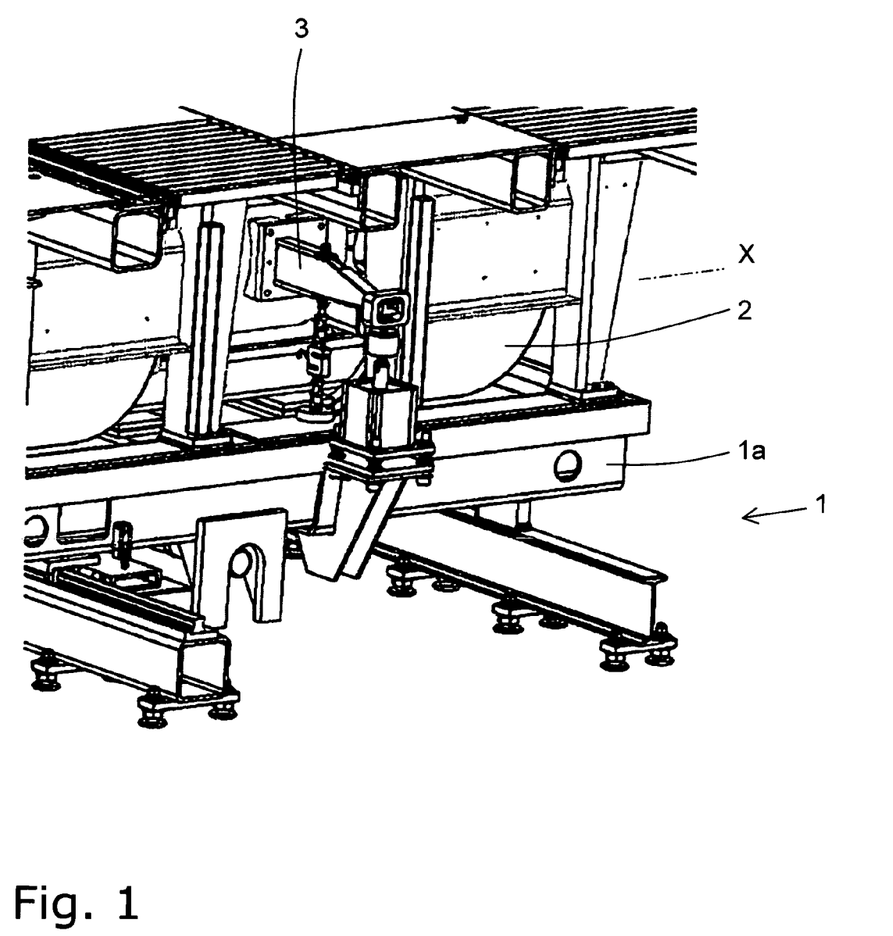
FIG. 1 is a fragmentary, perspective view of a section of an exemplary embodiment of a test stand according to the invention including a calibrating device.
Figure 2:
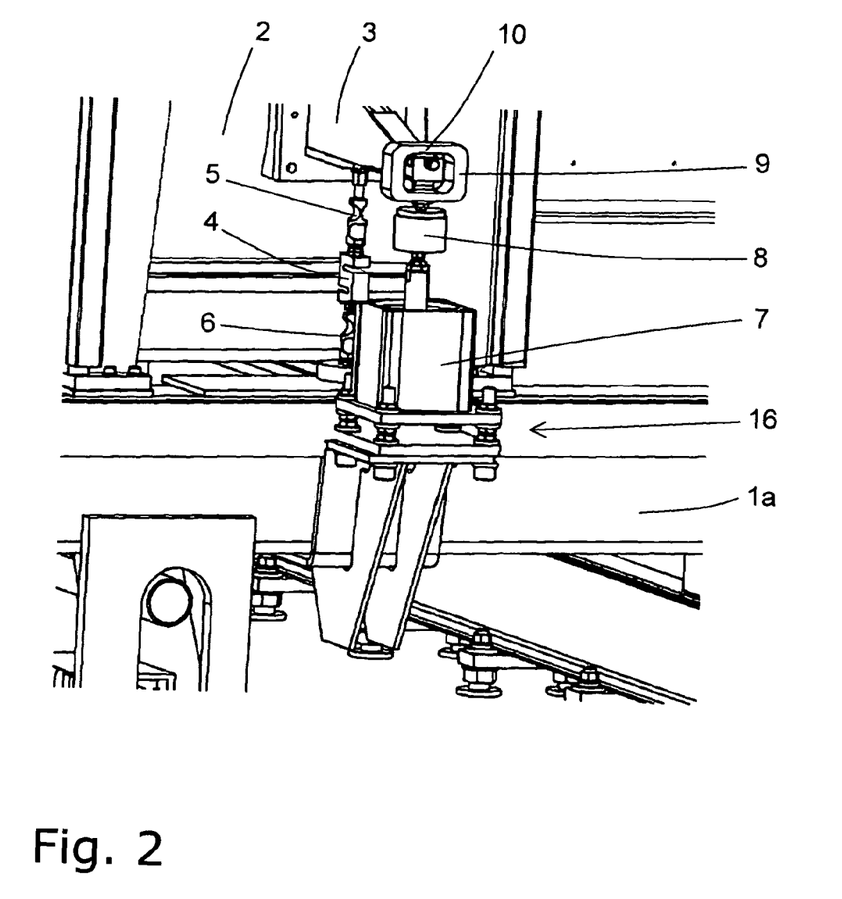
FIG. 2 a fragmentary, perspective view of an image section of the test stand of FIG. 1.

In the instant case, a lever arm 3, which extends perpendicular to the main axis X away from the stator housing, is also attached to the stator housing of the dynamometer 2.

The lever arm 3 is embodied to be so stiff that it deforms as little as possible even in response to a load. A force sensor 4 in the form of an S-shaped bending arm as force-measuring device is disposed approximately in the center of the lever arm 3 below the lever arm 3. The force sensor 4 is placed between an upper spring bar 5 and a lower spring bar 6. The upper spring bar 5 serves as force-transmission device and connects the force sensor 4 to the lever arm 3, while the lower spring bar 6 supports the force sensor 4 against the base 1.

With the help of the force sensor 4, a force with which the lever arm 3 is supported on the upper spring bar 5, can be determined accurately during the normal test operation. With the help of the measured force and by the effective length of the lever arm 3 (measured from the main axis X to the location, at which the upper spring bar 5 is coupled to the lever arm 3), the torque, which acts on the dynamometer 2 by the non-illustrated test specimen (e.g., a vehicle engine), can be determined.

The force-measuring chain comprising the force sensor 4 must be calibrated from time to time. For this purpose, provision is made for a calibrating apparatus, which encompasses a pneumatic cylinder 7 as reference force-generating device, a load cell 8 (e.g., a ring torsion load cell) as reference force-measuring device and a reference force-transmission device 9 for introducing the reference force onto the lever arm 3.

With the help of the calibrating apparatus, an accurately determined reference force can be exerted on the lever arm 3. A corresponding force must, accordingly, act on the force sensor 4 as a function of the lever arm ratios. In the event that the force sensor 4 does not measure this force, but a differing measuring value, it can be adjusted in a simple manner. The dynamometer 2 is unloaded during the calibrating process and is separated from the test specimen, so that the reference torque must be supported completely by the force sensor 4 in the ideal case.

The pneumatic cylinder 7 is suited to adjust a predetermined force with high accuracy and to keep it stable. It is advantageous when the pneumatic cylinder 7 acts in both directions, thus upward and downward, and when it can generate corresponding forces.

The load cell 8 serves to measure the reference force generated by the pneumatic cylinder 7, which is introduced into the lever arm 3 via the reference force-transmission device 9.

The load cell 8 can also be realized by different components, e.g., by an S-shaped bending arm. Likewise, the force sensor 4 can also be realized by a different component, e.g., by a load cell.

The reference force-transmission device 9 is embodied in the form of a yoke 10, which encompasses a substantially square frame, which encloses one end of the lever arm 3.

Figure 3:
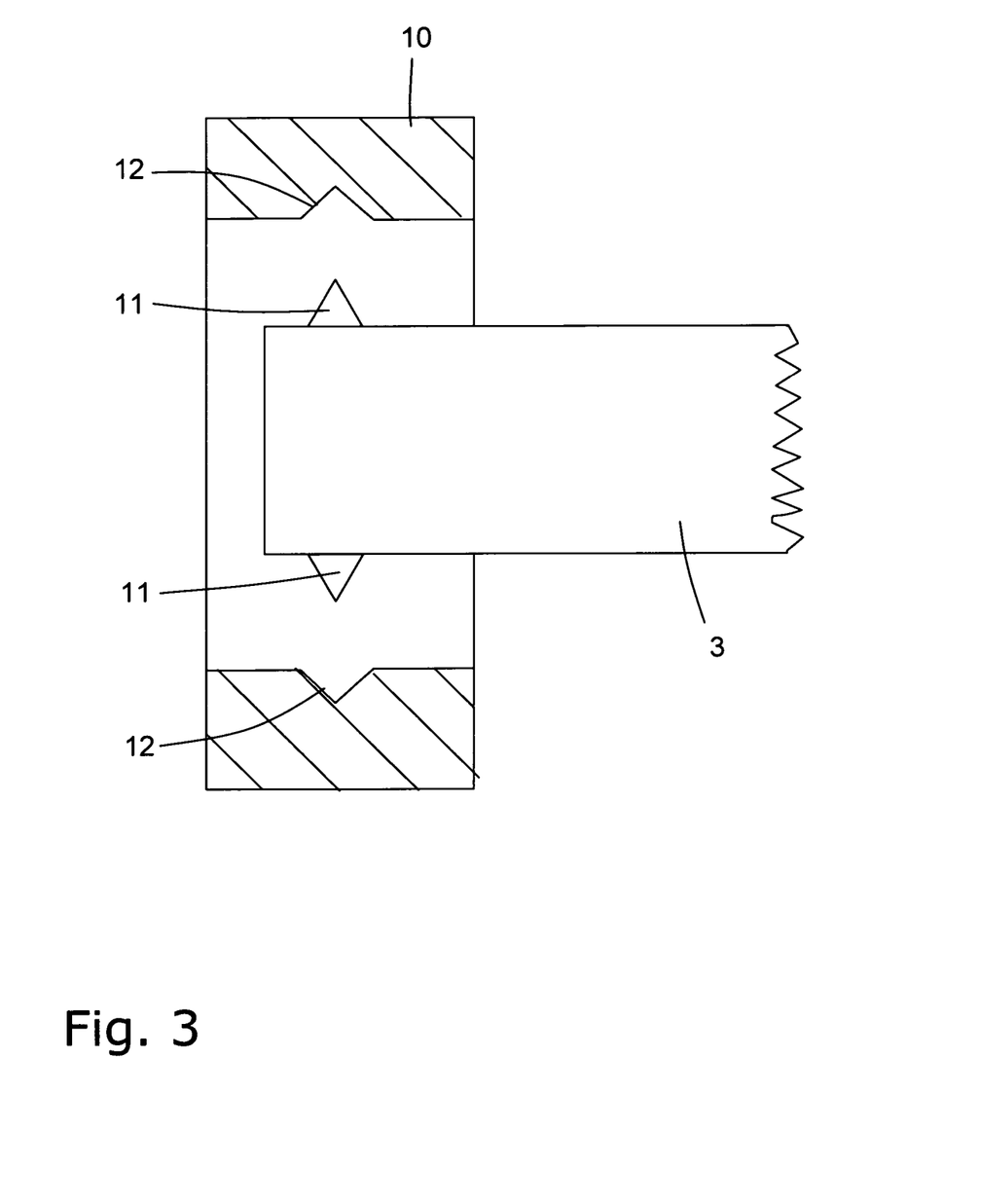
FIG. 3 a fragmentary, and partially cross-sectional view of a schematic illustration comprising one end of a lever arm and a yoke enclosing the lever arm according to the invention.

FIG. 3 shows the setup of the yoke 10 in relation to the end of the lever arm 3 in a basic illustration. At the end of the lever arm 3, a knife edge 11 is respectively disposed on the upper and lower sides. Knife edge supports 12 are embodied in the yoke 10 opposite the two knife edges 11. The knife edge supports 12 are illustrated in FIG. 3 with a prism-shaped depression. However, they can also be formed by flat small hard metal plates or in a different manner, for example, to ensure an accurate transmission of the respective force in cooperation with the knife edges 11.

In response to a vertical displacement of the yoke 10 due to an affect caused by the pneumatic cylinder 7, one of the knife edge supports 12 moves across the knife edge 11 associated with the respective knife edge support 12. This creates a line contact, which extends perpendicular to the drawing plane in FIG. 3, along the knife edge 11. The knife edge 11 extends along the main direction X of the dynamometer 2.

The force generated by the pneumatic cylinder 7 is transferred to the lever arm 3 via the line contact, whereby the lever arm 3 attempts to pivot the dynamometer 2 in its oscillating support. Accordingly, a force, which can be measured by the force sensor 4, is introduced at the force sensor 4.

In response to a movement of the yoke 10 in an opposite direction due to an opposite affect of the pneumatic cylinder 7, the pairing of knife edge 11 and knife edge support 12 located opposite one another comes into contact. The lever arm 3 is, then, loaded in the opposite direction.

Figure 4:
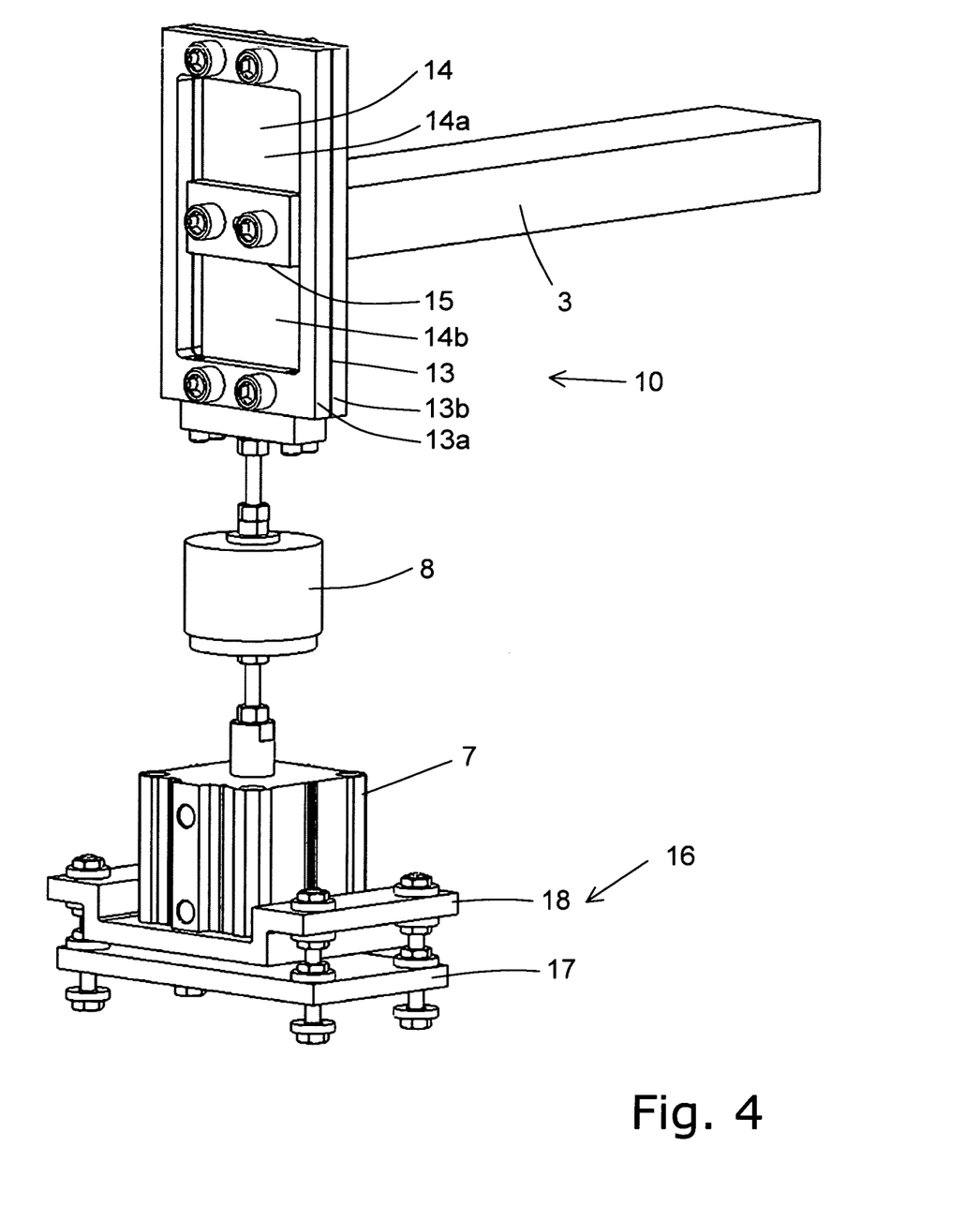
FIG. 4 is a perspective view of an alternative exemplary embodiment of a calibrating device according to the invention.
Figure 5:
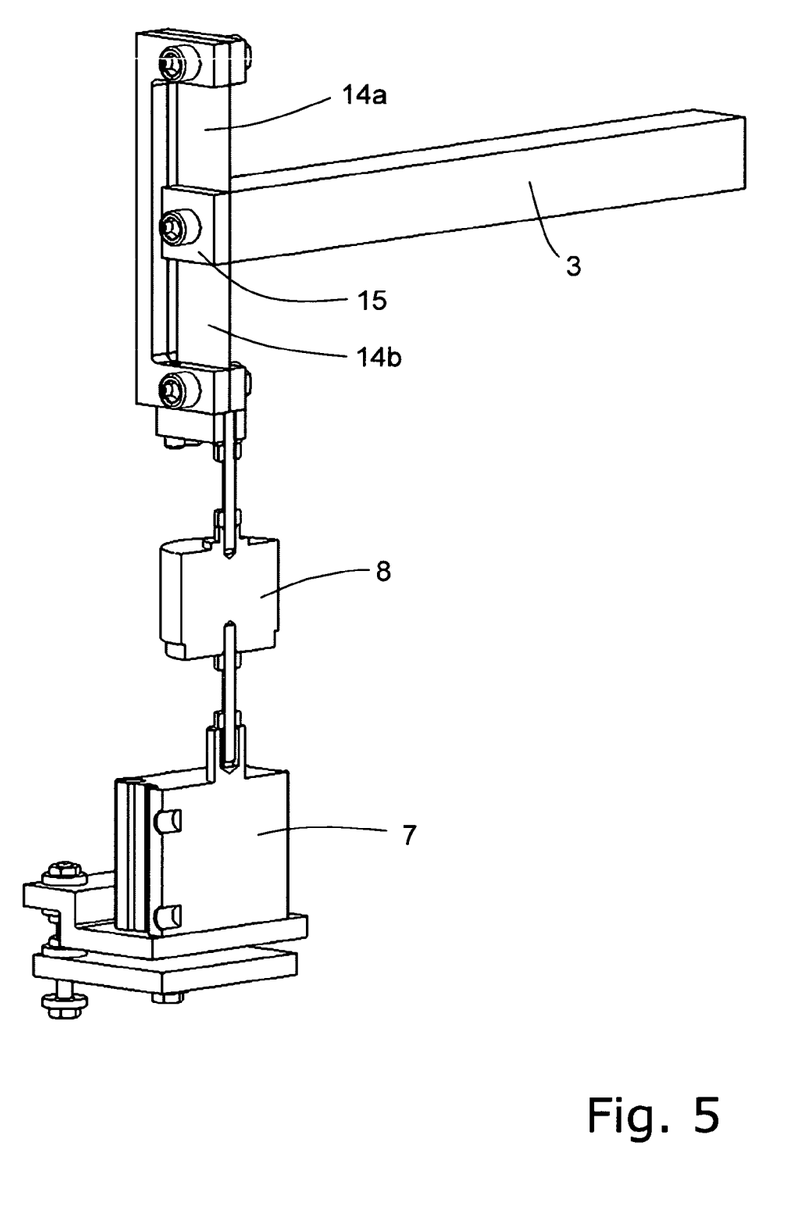
FIG. 5 is a cross-sectional view of the calibrating device of FIG. 4.

FIGS. 4 and 5 (which are sectional illustrations) show an alternative, in particular, for the yoke 10. The yoke 10 is thereby also embodied as a square frame 13. However, it does not encompass knife blades—as does the alternative illustrated in FIG. 3. Instead, the yoke 10 or the frame 13, respectively, comprises two planar halves 13a and 13b, which are held together by screws, for example.

A resiliently flexible, tensile metal foil 14 is inserted between the two halves 13a and 13b. Provided that it encompasses a sufficient strength, a plastic foil can also be used instead of the metal foil 14.

On the opposite sides, the metal foil 14 is clamped on the top and on the bottom between the halves 13a and 13b by a screw connection, for example. In the middle area, the metal foil 14 is fastened to the front side of the lever arm 3, whereby the yoke 10 is held on the lever arm 3. The fastening of the yoke 10 to the lever arm 3 is formed by a foil screw connection, wherein a clamping piece 15, which is attached to the metal foil 14, connects the metal foil 14 to the front side of the lever arm 3.

The effective length (length, which is important for the determination of the reference torque resulting from the effective reference force) of the lever arm 3 cannot change with this type of fastening of the metal foil 14 to the lever arm 3 or with this type of force introduction into the lever arm 3, respectively, as it is possible in the case of the embodiment shown in FIG. 3 due to transverse force effects. In the case of the type of force transmission in the yoke shown in FIGS. 4 and 5, the foil half (upper foil half 14a or lower foil half 14b) that is tensioned always participates in the force-transmission. In the event that the pneumatic cylinder 7 generates a tensile force downward, the lower foil half 14b transmits the tensile force to the lever arm 3; in the event that the pneumatic cylinder 7 generates a compressive force upward, the upper foil half 14a transmits the force of the pneumatic cylinder 7, which is oriented upward, in the yoke 10.

The effective length of the lever arm 3, which is included in the torque computation, is comprised of the horizontal lever arm length (distance from the main axis X to the force-introduction location) plus half of the foil thickness. This length needs to be determined accurately only once, it does not change, because wear cannot occur.

A compensating device 16 is shown in the lower figure part of FIG. 4, but also in FIGS. 1 and 2. The compensating device 16 couples the pneumatic cylinder 7 to the base 1 of the test stand to support the pneumatic cylinder 7. The compensating device 16 is, thereby, able to compensate alignment and/or angle errors. For this purpose, the compensating device 16 encompasses a lower plate 17 and an upper plate 18, which are coupled to one another by screw connections, for example. By adjusting the screws, the mentioned errors can be compensated.

Figure 6:
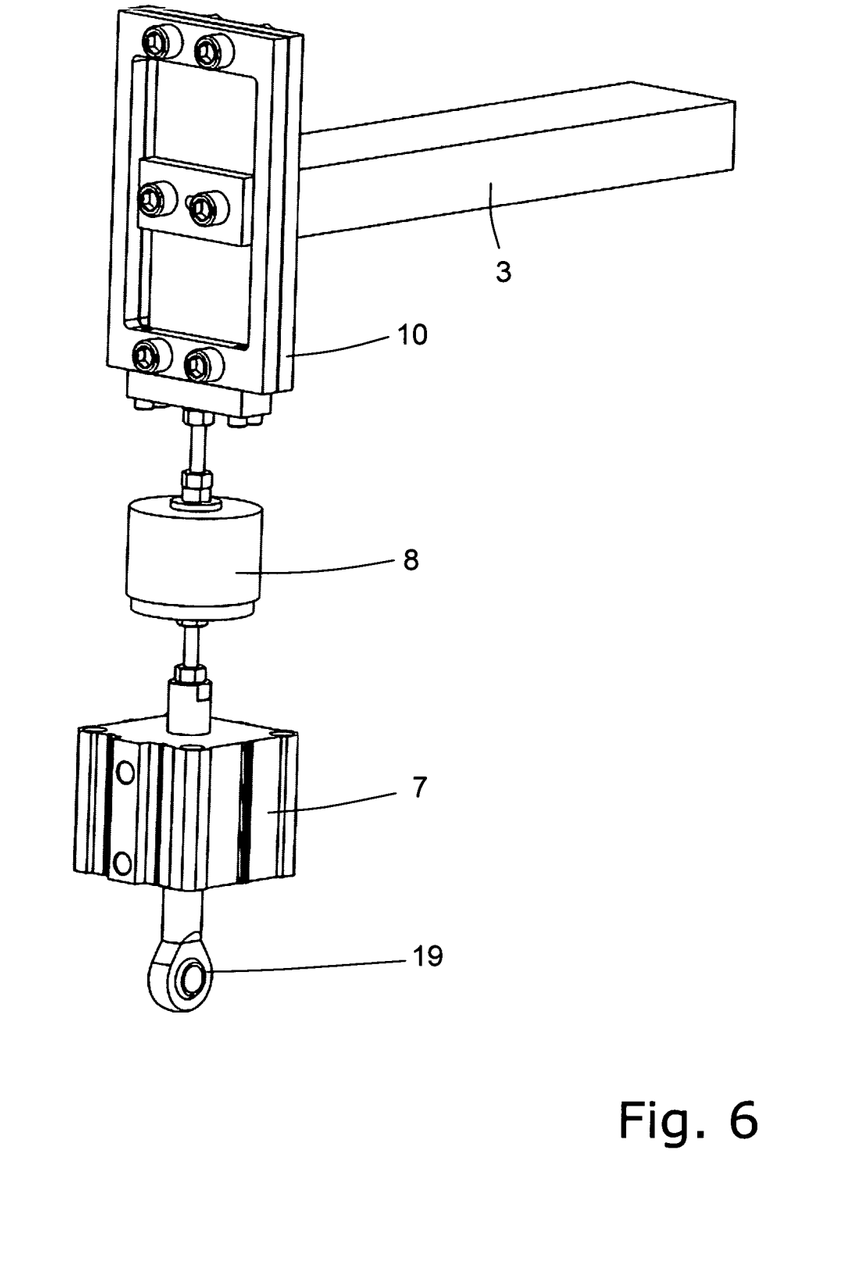
FIG. 6 is a perspective view of a further alternative exemplary embodiment of a calibrating device according to the invention.

FIG. 6 shows an alternative, in which provision is made for a ball joint 19 instead of the compensating device 16. The ball joint 19 also provides for the compensation of alignment or angle errors.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A force-measuring calibration test stand, comprising a load device:
   comprising a housing and a main axis;
   being supported at the housing; and
   being operable to oscillate about the main axis;
   a lever arm extending away from the housing perpendicular to the main axis;
   a force-transmission device coupled to the lever arm and operable to transmit a force oriented perpendicular to the main axis and perpendicular to the lever arm;
   a force-measuring device coupled to the lever arm by the force-transmission device; and
   a force-measuring calibration device comprising:
   a reference force-generating device operable to generate a reference force;
   a reference force-measuring device coupled to the reference force-generating device and operable to measure the reference force generated; and
   a reference force-transmission device coupled to the lever arm and operable to transmit the reference force to the lever arm
   wherein the force-measuring device, the force-transmission device, the reference force-generating device, and the reference force-transmission device are on the same side of the housing relative to the main axis.

2. The test stand according to claim 1, wherein the reference force-generating device comprises one of a pneumatic cylinder unit and a hydraulic cylinder unit.

3. The test stand according to claim 1, wherein:
   the load device is a dynamometer having a stator housing; and
   the lever arm is fastened to the stator housing and extends perpendicular to the main axis.

4. The test stand according to claim 1, wherein:
   the lever arm has an outer end; and
   the reference force-transmission device is at the outer end of the lever arm.

5. The test stand according to claim 4, wherein the reference force-transmission device comprises a yoke.

6. The test stand according to claim 5, wherein the yoke encloses the outer end of the lever arm.

7. The test stand according to claim 1, wherein:
   the lever arm has an outer end; and
   the reference force-transmission device comprises a yoke enclosing the outer end of the lever arm.

8. The test stand according to claim 7, wherein:
   transfer pairs each comprising a knife edge and a knife edge support are respectively disposed above and below the lever arm between the yoke and the lever arm and are operable to transfer the reference force; and
   one of:
   the knife edge of each transfer pair is provided on the lever arm and the opposing knife edge support is provided on the yoke; and
   the knife edge of each transfer pair is provided on the yoke and the opposing knife edge support is provided on the lever arm.

9. The test stand according to claim 7, wherein:
the yoke comprises a rectangular frame enclosing the outer end of the lever arm;
a flange of a piece of foil is fastened respectively to the frame on at least one of the upper side of the frame and the lower side of the frame; and
an area of the piece of foil located between the upper and lower sides of the frame is fastened to the outer end of the lever arm.

10. The test stand according to claim 9, wherein:
the lever arm has a frontal end; and
the piece of foil has:
an upper flange clamped to the upper side of the frame;
a lower flange clamped to the lower side of the frame; and
a middle area clamped to the frontal end of the lever arm.

11. The test stand according to claim 9, wherein:
the frame has upper flange and a lower flange;
the lever arm has a frontal end;
the piece of foil is formed by two separate pieces of foil;
one of the pieces of foil is an upper piece of foil clamped between the upper flange of the frame and the frontal end of the lever arm; and
the other one of the pieces of foil is a lower piece of foil clamped between the lower flange of the frame and the frontal end of the lever arm.

12. The test stand according to claim 1, further comprising:
a test stand base;
a support comprising a compensating device, being coupled to the test stand base, and supporting the reference force-generating device; and
the compensating device being operable to compensate for at least one of alignment errors and angle errors.

13. The test stand according to claim 1, further comprising a control device operable:
to control the reference force-generating device; and
to effect one of:
a force higher than a nominal reference force temporarily in response to an adjustment of a desired nominal reference force when the reference force is increased; and
a lower force than the nominal reference force temporarily in response to an adjustment of a desired nominal reference force when the reference force is reduced.

14. A method for calibrating a force-measuring device in a test stand, which comprises:
providing a test stand comprising:
a load device supported to oscillate about a main axis, the load device having a housing;
a lever arm extending perpendicular to the housing of the load device;
the force-measuring device coupled to the lever arm;
a reference force-generating device disposed the same side of the housing as the force-measuring device and coupled to the lever arm; and
a reference force-measuring device disposed in a flux of force between the reference force-generating device and the lever arm and operable to measure a reference force generated;
generating the reference force with the reference force-generating device;
measuring the reference force with the reference force-measuring device;
measuring a force acting on the force-measuring device in the form of an actual force value;
determining a nominal force value that would have to apply to the force-measuring device due to a measured reference force and effective lever ratios; and
calibrating the force-measuring device by comparing the actual force value measured by the force-measuring device with the nominal force value.

15. The method according to claim 14, which further comprises initially effecting an overshoot of the reference force beyond a desired reference force value when generating the reference force.

16. The method according to claim 14, which further comprises controlling the reference force-generating device so that the lever arm is not loaded with a force from the reference force-generating device.

* * * * *